United States Patent [19]

Cheng

[11] Patent Number: 5,069,826

[45] Date of Patent: Dec. 3, 1991

[54] INFRARED RADIATION ABSORBING BLUE GLASS COMPOSITION

[75] Inventor: J. Joseph Cheng, Perrysburg, Ohio

[73] Assignee: Libbey-Owens-Ford Co., Toledo, Ohio

[21] Appl. No.: 587,243

[22] Filed: Sep. 24, 1990

Related U.S. Application Data

[60] Division of Ser. No. 418,657, Oct. 10, 1989, Pat. No. 5,013,487, which is a continuation-in-part of Ser. No. 395,550, Aug. 18, 1989, abandoned.

[51] Int. Cl.$^5$ .............................. F21V 9/04; B04B 1/04; B04B 1/08
[52] U.S. Cl. ...................................... 252/587; 501/68; 501/69; 501/70
[58] Field of Search .................. 252/587, 588; 501/68, 501/69, 70

[56] References Cited

U.S. PATENT DOCUMENTS 2,636,420  4/1953  Ryan et al. .......................... 252/587

FOREIGN PATENT DOCUMENTS 590270  1/1978  U.S.S.R. ................................ 501/70
643450  1/1979  U.S.S.R. ................................ 501/70

Primary Examiner—John S. Maples
Assistant Examiner—Philip Tucker
Attorney, Agent, or Firm—Marshall & Melhorn

[57] ABSTRACT

Blue-colored, infrared radiation absorbing glass compositions are prepared by the addition of zinc sulfide and zinc oxide to glass compositions containing iron. The zinc sulfide acts as a reducing agent, to maintain a portion of the iron in the ferrous state, and the zinc oxide prevents amber coloration of the glass which would otherwise occur due to the addition of the zinc sulfide to the glass batch.

5 Claims, No Drawings

INFRARED RADIATION ABSORBING BLUE GLASS COMPOSITION

RELATED APPLICATIONS

This application is a division of application Ser. No. 07/418,657, filed Oct. 10, 1989 now U.S. Pat. No. 5,013,487 which is a continuation-in-part of U.S. application Ser. No. 07/395.550. filed Aug. 18, 1989 now abandoned.

FIELD OF THE INVENTION

The present invention relates generally to infrared radiation absorbing blue glass compositions, and more particularly, to blue-colored, infrared radiation absorbing glass compositions, having a desirable combination of energy absorption and light transmittance properties Thus, the present invention is particularly useful for producing automotive and architectural glazings, for the reason that warm weather air conditioning loads may be reduced while at the same time providing a pleasing visual effect.

BACKGROUND OF THE INVENTION

It is generally known to manufacture infrared radiation absorbing soda-lime-silica glass by the incorporation therein of iron. The iron is present in the glass as both ferrous oxide (FeO) and ferric oxide ($Fe_2O_3$). The ferrous oxide imparts a bluish tint to the glass, and provides for the absorption of radiant energy at the infrared end of the visible spectrum. Ferric oxide, however, imparts a yellowish tint, and causes the glass to absorb ultraviolet radiation. Consequently, a proper balance must be achieved in order to produce a blue-colored glass having desirable infrared energy absorption and light transmittance characteristics.

U.S. Pat. No. 3,652,303 discloses a heat absorbing blue soda-lime-silica glass composition wherein at least 80% of the total iron in the glass is maintained in the ferrous state, during the forming and any subsequent reheating process, by the inclusion of an amount of tin metal or stannous chloride in the melt so as to result in a tin concentration (the majority of which is in the stannous state) in the finished glass article of up to 15% by weight. The purpose of the tin is to serve as an internal reducing agent in the glass, to prevent any tendency toward conversion of the ferrous ion to the ferric species arising from oxidizing influences, such as for example the diffusion of oxygen from the air into the glass during the reheating incident to conventional subsequent fabrication processes like press bending or thermal tempering.

U.S. Pat. No. 2,755,212 discloses a blue-green infrared radiation absorbing glass containing iron, wherein the ration of ferric to ferrous iron is maintained by the addition of carbon as the reducing agent.

U.S. Pat. No. 3,326,703 discloses a heat-absorbing boroaluminosilicate glass composition, wherein carbon, aluminum, or tin oxide are utilized to reduce the $Fe_2O_3$ to FeO.

Japanese Patent Publication No. 60215546 (1985) discloses an infrared radiation absorbing clear glass composition which utilizes barium oxide to shift the absorption peak of FeO toward the infrared portion of the visible spectrum The amber coloration caused by the sulfur, which is present as a reducing agent for the iron, is suppressed by the addition of zinc oxide.

Finally, U.S. Pat. No. 3,779,733 discloses a process for manufacturing heat absorbing glass, by employing a moderate amount of iron in the batch composition, and controlling the reducing conditions to maintain a large portion of the iron in the ferrous state. Control is achieved by conducting the melting and refining operation in discrete stages, without a large volume of melt being retained in either stage, while at the same time minimizing the sulfur content of the melt by avoiding the addition of sulfur-containing refining aids into the batch and by evacuating the process vessels so as to eliminate even trace impurities of sulfur.

It must be noted that the prior art referred to hereinabove has been collected and reviewed in light of the present invention as a guide. It is not to be inferred that such diverse art would otherwise be assembled absent the motivation provided by the present invention.

SUMMARY OF THE INVENTION

Accordant with the present invention, there has surprisingly been discovered a blue-colored infrared radiation absorbing glass composition, comprising:
 A) from about 68 to about 74 weight percent $SiO_2$;
 B) from about 11 to about 14 weight percent $Na_2O$;
 C) from about 0 to about 1 weight percent $K_2O$;
 D) from about 1.5 to about 4 weight percent MgO;
 E) from about 6 to about 13 weight percent CaO;
 F) from about 0 to about 3 weight percent $Al_2O_3$;
 G) from about 0 to about 0.5 weight percent $TiO_2$;
 H) from about 0.3 to about 0.7 weight percent $Fe_2O_3$;
 I) from about 0 to about 0.6 weight percent $SnO_2$;
 J) from about 0.5 to about 1.2 weight percent ZnO; and
 K) from about 0.15 to about 0.4 weight percent $SO_3$--.

The glass composition of the present invention is particularly suited for the production of blue-colored heat absorbing automotive and architectural glazings.

DETAILED DESCRIPTION OF THE PREFERRED EMBODIMENT

Suitable batch materials according to the present invention, which are compounded by conventional glass batch ingredient mixing processes, include sand, limestone, dolomite, soda ash, rouge, tin oxide, zinc sulfide, zinc oxide, and optionally gypsum. These materials are conveniently melted together in a conventional glass making furnace, to form a blue-colored infrared radiation absorbing glass composition, which thereafter may be continuously cast onto the molten metal bath in a float glass process. The flat glass thus produced may be formed into architectural glazings, or cut and formed such as for example by press bending into automotive glazings.

The composition of the resultant glass comprises:
from about 68 to about 74 weight percent $SiO_2$;
from about 11 to about 14 weight percent $Na_2O$;
from about 0 to about 1 weight percent $K_2O$;
from about 1.5 to about 5 weight percent MgO;
from about 6 to about 13 weight percent CaO;
from about 0 to about 3 weight percent $Al_2O_3$;
from about 0 to about 0.5 weight percent $TiO_2$;
from about 0.3 to about 0.7 weight percent $Fe_2O_3$;
from about 0 to about 0.6 weight percent $SnO_2$;
from about 0.5 to about 1 2 weight percent ZnO; and
from about 0.15 to about 0.4 weight percent $SO_3$--.
Preferably, the resultant glass composition comprises:
from about 70 to about 73 weight percent $SiO_2$;
from about 12 to about 14 weight percent $Na_2O$;

from about 0 to about 1 weight percent $K_2O$;
from about 3 to about 4 weight percent MgO;
from about 6 to about 10 weight percent CaO;
from about 0 to about 2 weight percent $Al_2O_3$;
from about 0 to about 0.5 weight percent $TiO_2$;
from about 0.3 to about 0.65 weight percent $Fe_2O_3$;
from about 0.1 to about 0 6 weight percent $SnO_2$;
from about 0.6 to about 1 2 weight percent ZnO; and
from about 0.2 to about 0 35 weight percent $SO_3^{--}$.

Silica forms the glass matrix. Sodium oxide, potassium oxide, magnesium oxide, and calcium oxide act as fluxes, to reduce the melting temperature of the glass. Alumina regulates the viscosity of the glass and prevents divitrification. Moreover, the magnesium oxide, calcium oxide, and alumina act together to improve the durability of the glass. The iron provides the bluish color to the glass, and additionally acts as the principal infrared radiation absorbing agent. Tin is present in small quantities, and acts as a reducing agent to maintain the iron in the ferrous state. Zinc sulfide is the primary reducing agent, which persists in reducing the iron even during subsequent reheating operations such as for example thermal tempering or press bending. Additionally, the zinc sulfide eliminates the necessity of using gypsum or salt cake as refining agents. The zinc sulfide reacts in the batch to form zinc oxide and the $SO_3^{--}$ complex. At least 50% of the zinc oxide detected in the resultant glass product is derived from the addition of zinc sulfide. Zinc oxide, which is also added directly to the batch, prevents the formation of amber coloration which would otherwise occur due to the addition of the zinc sulfide.

The glass compositions of the present invention conveniently may be formed into plate glass or flat glass articles, such as for example automotive and architectural glazings, having a pleasing bluish tint. The blue coloration is characterized by a dominant wavelength from about 485 to about 494 nanometers, and a purity from about 6% to about 9%. Such glass articles additionally are characterized by visible light transmittance Illuminant A values of at least about 70%, and solar energy transmittance values of less than about 50%, for articles having a thickness of about 5 mm.

The invention is more easily comprehended by reference to specific embodiments, which are representative of the invention. It must be understood, however, that the specific embodiments are provided only for the purposes of illustration and understanding, and that the invention may be practiced otherwise than as specifically illustrated and described without departing from its spirit and scope.

EXAMPLES I-IV

Glass, embodying the features of the present invention, is prepared by thoroughly mixing and melting together, batch compositions containing the following ingredients in approximate weights:

TABLE A

| Ingredient | Approximate Weight, in Pounds | | | |
| --- | --- | --- | --- | --- |
| | I | II | III | IV |
| Sand | 150 | 150 | 150 | 150 |
| Limestone | 12 | 12 | 12 | 12 |
| Dolomite | 38 | 38 | 38 | 38 |
| Soda Ash | 50 | 50 | 50 | 50 |
| Rouge | 0.8 | 0.8 | 0.8 | 0.8 |
| $SnO_2$ | 1 | 0.4 | 0.6 | 0.6 |
| ZnO | 0.5 | 1 | 1 | 0.8 |
| ZnS | 1.5 | 1.3 | 1.3 | 1.3 |

TABLE A-continued

| Ingredient | Approximate Weight, in Pounds | | | |
| --- | --- | --- | --- | --- |
| | I | II | III | IV |
| Gypsum | 1.2 | 0 | 0 | 0 |

The resulting glass compositions, in approximate weight percentages, are:

TABLE B

| Component | Approximate Weight % | | | |
| --- | --- | --- | --- | --- |
| | I | II | III | IV |
| $SiO_2$ | 71.3 | 71.5 | 71.5 | 71.5 |
| $NaO_2$ | 13.9 | 14.0 | 14.0 | 14.0 |
| $K_2O$ | 0.01 | 0.01 | 0.01 | 0.01 |
| MgO | 4.0 | 4.0 | 4.0 | 4.0 |
| CaO | 8.6 | 8.6 | 8.6 | 8.6 |
| $Al_2O_3$ | 0.2 | 0.2 | 0.2 | 0.2 |
| $TiO_2$ | 0.01 | 0.01 | 0.01 | 0.01 |
| $Fe_2O_3$ | 0.4 | 0.4 | 0.4 | 0.4 |
| $SnO_2$ | 0.48 | 0.19 | 0.29 | 0.29 |
| ZnO | 0.83 | 1.0 | 1.0 | 0.9 |
| $SO_3^{--}$ | 0.35 | 0.24 | 0.24 | 0.23 |

Sheet glass thus produced is characterized by the following performance parameters, at a thickness of approximately 5 mm:

TABLE C

| Characteristic | Parameter | | | |
| --- | --- | --- | --- | --- |
| | I | II | III | IV |
| Illuminate A (%) | 71.1 | 70.8 | 70.1 | 70.4 |
| Illuminate C (%) | 74.0 | 73.7 | 72.9 | 73.1 |
| Total Solar Transmittance (%) | 41.0 | 40.9 | 40.3 | 40.5 |
| Dominant Wavelength (nm) | 488.1 | 488.5 | 488.2 | 488.6 |
| Color Purity (%) | 8.6 | 8.6 | 7.5 | 6.6 |

What is claimed is:

1. In a process for producing a blue-colored, infrared radiation absorbing soda-lime silica glass glazing containing iron, the process including preparing a glass batch, melting and fining the batch and then casting same to provide a glass product, and thereafter reheating and optionally bending the glass product to provide said glazing, the improvement comprising the step of adding to the glass batch an effective amount of zinc sulfide sufficient for reducing a quantity of the iron, and maintaining the quantity of iron in the reduced state during said subsequent reheating step.

2. A process for producing a blue-colored, infrared radiation absorbing soda-lime silica glass composition, the glass composition comprising:
 A) from about 68 to about 74 weight percent $SiO_2$;
 B) from about 11 go about 14 weight percent $Na_2O$;
 C) from about 0 to about 1 weight percent $K_2O$;
 D) from about 1.5 to about 5 weight percent MgO;
 E) from about 6 to about 13 weight percent $Al_2O_3$;
 F) from about 0 to 3 weight percent $Al_2O_3$;
 G) from about 0 to about 0.5 weight percent $TiO_2$;
 H) from about 0.3 to about 0.7 weight percent $Fe_2O_3$;
 I) from about 0 to about 0.6 weight percent $SnO_2$;
 J) from about 0.5 to about 1.2 weight percent ZnO; and
 K) from about 0.15 to about 0.4 weight percent $SO_3^{--}$.
 the process including the steps of melting and fining batch ingredients to provide the glass composition and casting the same to form a glass product and reheating the product to provide a glazing, the process further including the steps of A) adding to the batch ingredients an effective iron reducing amount of zinc sulfide as a reducing agent and as an agent to maintain iron in a reduced state;
B) reducing the iron content of the glass composition with the zinc sulfide; and
C) maintaining the reduced content of the iron with the zinc sulfide to provide a glass product and glazing with reduced iron content.

3. A method as defined in claim 2 in which there are further steps of reheating the glass product and maintaining the reduced iron content during the reheating step.

4. A process defined in claim 2 which includes the step of reacting zinc sulfide in the batch during melting to provide zinc oxide and $SO_3$-- complex:

5. A process as defined in claim 4 in which at least about 50 weight percent of the ZnO in the glass product is derived from the zinc sulfide.

* * * * *

UNITED STATES PATENT AND TRADEMARK OFFICE
CERTIFICATE OF CORRECTION

PATENT NO. : 5,069,826

DATED : December 3, 1991

INVENTOR(S) : J. Joseph Cheng

It is certified that error appears in the above-identified patent and that said Letters Patent is hereby corrected as shown below:

Col. 1, line 10, "07/395.550." should have the periods (.) replaced by commas (,); line 66, a period (.) should be inserted after "spectrum".

Column 2, line 64, "1 2" should read --1.2--.

Column 3, line 8, "1 2" should read --1.2--; line 9, "0 35" should read --0.35--.

Col. 4, line 57, "about" should be inserted between "to" and "3".

Signed and Sealed this

First Day of June, 1993

Attest:

MICHAEL K. KIRK

*Attesting Officer*   Acting Commissioner of Patents and Trademarks